United States Patent
Lancho Doncel et al.

(10) Patent No.: US 6,305,871 B1
(45) Date of Patent: Oct. 23, 2001

(54) SYSTEM FOR THE MODIFICATION OF THE RIGIDITY AND DAMPING PROPERTIES OF STRUCTURAL JOINTS

(75) Inventors: Miguel Lancho Doncel; Enrique Cabrera Revuelta; Fernando Cespedosa Castan, all of Madrid (ES)

(73) Assignee: Construcciones Aeronauticas, S.A., Madrid (ES)

( * ) Notice: Subject to any disclaimer, the term of this patent is extended or adjusted under 35 U.S.C. 154(b) by 0 days.

(21) Appl. No.: 09/334,141

(22) Filed: Jun. 15, 1999

(30) Foreign Application Priority Data

Nov. 18, 1998 (ES) .................................... 9802421

(51) Int. Cl.$^7$ ...................................... B64G 1/64
(52) U.S. Cl. ......................... 403/286; 403/322.3; 74/574; 344/148 R
(58) Field of Search .................... 403/286, 321, 403/322.1, 322.3; 244/158 R, 161, 164; 74/574

(56) References Cited

U.S. PATENT DOCUMENTS

| | | | |
|---|---|---|---|
| 3,346,929 | * | 10/1967 | Webb . |
| 3,458,217 | * | 7/1969 | Pride . |
| 3,505,925 | * | 4/1970 | Carr . |
| 3,529,417 | * | 9/1970 | Knight . |
| 3,564,564 | * | 2/1971 | Paine . |
| 3,633,456 | * | 1/1972 | Carr . |
| 3,737,117 | * | 6/1973 | Belew . |
| 5,169,260 | * | 12/1992 | Balemboy et al. . |
| 5,244,170 | * | 9/1993 | Shekher ............................ 244/158 R |
| 5,860,624 | * | 1/1999 | Obry ................................. 244/158 R |
| 5,961,078 | * | 10/1999 | Edberg et al. .................... 244/158 R |
| 6,076,467 | * | 6/2000 | Cespedosa et al. .............. 244/158 R |

FOREIGN PATENT DOCUMENTS

| | | |
|---|---|---|
| 0402263 | 12/1990 | (EP) . |
| 0469939 | 2/1992 | (EP) . |
| 0768241 | 4/1997 | (EP) . |
| 0 768 241 | * 4/1997 | (ES) . |
| 2120338 | 10/1998 | (ES) . |
| 2 516 893 | * 5/1983 | (FR) . |
| 03148400 | 6/1991 | (JP) . |

OTHER PUBLICATIONS

Patent Abstract, JP Pub.No 03148400, Jun. 25, 1991.*
English Abstract of FR 2516893 Dated May 27, 1983.
English Abstract of EP 0469939 Dated Feb. 5, 1992.

* cited by examiner

*Primary Examiner*—Lynne H. Browne
*Assistant Examiner*—Tomlyne A Malcolm
(74) *Attorney, Agent, or Firm*—Ladas and Parry

(57) ABSTRACT

A system for the modification of the rigidity and damping properties of structural joints comprises at least an intermediate structure (3) to receive, on both sides, two structures (1, 2) to be coupled; releasable blocking means (6) to immobilize, in a coupled condition, said two structures to be coupled and said intermediate structure; first and second sets of bistable components (7, 8), the structural resistance features of the components of the first set being different from those of the second set; the components of the first set being internally connected to one of said structures to be coupled and to said intermediate structure; the components of the second set being internally connected to one and other of said structures to be coupled; said bistable components being in an unstable condition when all the mentioned structures are coupled together. The invention is applicable to the field of space vehicles.

11 Claims, 6 Drawing Sheets

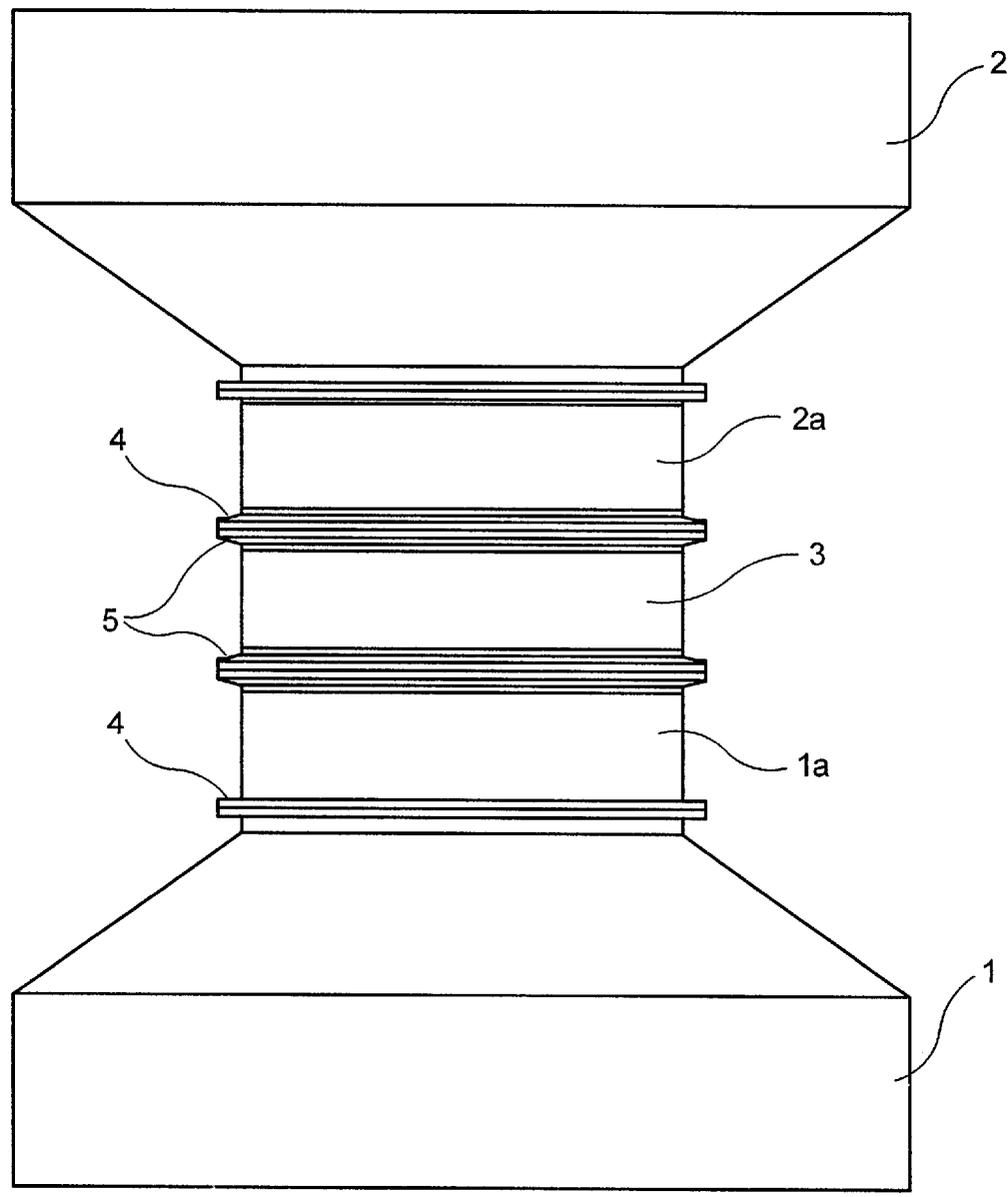
F I G.1

SYSTEM FOR THE MODIFICATION OF THE RIGIDITY AND DAMPING PROPERTIES OF STRUCTURAL JOINTS

FIELD OF THE INVENTION

The present invention relates to the field of structural joints and, more specifically, refers to a system permitting the features of a structural joint to be modified in response to a control order depending on the needs demanded under a determined condition.

BACKGROUND OF THE INVENTION

The need to modify the structural properties of a connection or coupling between two structures, for instance with the purpose of attenuating, filtering and/or dissipating mechanical shocks induced from one of the coupled structures over the other coupling structure or to modify the dynamic-structural joint between them, has resulted in the development and application of different systems, each one being suitable for a specific function like, for example, viscoelastic, friction energy dissipators, etc., relative orientation devices for structures using electric motors, pneumatic drives and others, anchoring and release devices for said structures or also in the specific design of said structures to couple according to the coupling schedule.

Several systems are known to achieve a safe and releasable fastening of two structures which under a first condition should be interlocked and rigidly connected and that, in at least a second condition, should be able to be released, one being separated from the other in response to a control order transmitted in a specific moment.

Especially in the field of space technology, different systems are known to interlock a launch vehicle and a pay-load (for example, a satellite) until entry in the foreseen orbit, when the rigid interconnection between both structures breaks, permitting the separation of said pay-load from said vehicle.

As a prior art example, the applicant's own European patent application published with number 0768241 may be mentioned, in which a satellite fastening and separation system is protected. The object of the invention described in this application is to simplify the fastening of the satellite to the satellite launching rocket and its release on entering into orbit. This object is achieved by means of a fastening component which is bolted to the upper ring of the launching rocket adapter, a tensing strip consisting of a two part metallic band, and curved metallic parts to fasten the satellite resting by their upper part on the lower ring of the latter, surrounding it and pressing against it.

Also, U.S. Pat. No. 3,737,117, applicable to a space docking system for space craft, disclose two conical structures, one consisting of a docking container in one of the crafts and the other one in the form of a conical protrusion in a second craft. When both conical docking components couple, they remain hooked together, the docking energy being absorbed by compressed gas contained in a tight compartment whose outer part is the conical container of the first craft. The rebound forces are counteracted by a plurality of actuating cylinders supporting the conical container.

French patent application 8122144, of Nov. 26, 1981, protects a fastening and release system permitting the temporary connection between two parts, one mobile and the other one stationary, which have to be separated during their specific use. The system allows both parts to block in a determined position and, at a given moment, to pass to a release status in which a mobile support and a bracket are in a retracted position, releasing said mobile part. The system is especially applicable to the space field.

U.S. Pat. No. 3,564,564, refers to a hooking device to fasten docking rings in space vehicles. It comprises a fastening hook connected to an energy storage assembly, such as a spring, and an assembly handle which simultaneously releases the hook and stores energy in the assembly. It also comprises triggering means to suitably position the hook and to retain it in the assembled position until it is released at the right time.

EP 0402263, "Temporary Joint Device, Especially for an Artificial Satellite Appendix and Release Procedure of said Joint", describes a fastening device that may apply a mechanical retaining stress among the components to be coupled, and releasing devices, whose thermal performance eliminates said mechanical stress and creates a separation permitting a relative movement between components, whose releasing devices incorporate a member made of a material with memory of shape and which cooperates with the fastening device.

Finally, in European patent number 0469939, "Linking Device Between Two Objects by Several Fastening Points", it is disclosed that one of said objects has mobile bayonet parts connected by connecting rods in order to simultaneously control them. The other object has fixed bayonet parts. The device operates in two stages, a first phase establishes the link by means of the bayonet parts and the second phase, the adjustment of wedges. The bayonets are only allowed to rotate if the action of a blocking system is interrupted.

As mentioned before, all these documents disclose different fastening and/or releasing devices for a coupling, allowing two structures to be coupled to each other in an interlocked manner until a determined moment, in which said coupling is interrupted in order to separate said structures or viceversa. The common method to sever this interconnection between said structures is to activate at least one pyrotechnical charge or otherwise to break the mechanical joints interlocking them.

Now then, in the couplings of the known art, means to prevent the shocks or vibrations generated in one of the coupled structures to be transmitted to the other structure are not foreseen, so that the latter may be mechanically affected which for example is very important in the field of space vehicles, where important shocks or vibrations are generated when separation of the different vehicle phases occurs generally by pyrotechnical methods. Said shocks and vibrations are directly transmitted by the couplings used until now to the delicate and useful load transported (e.g., a satellite).

In the aforementioned prior art, the problem represented by these shocks or vibrations is not dealt with, although they may severely affect the released structure.

SUMMARY OF THE INVENTION

Generally speaking, the system of the invention permits two structures to be interconnected by means of the interposition of a third structure therebetween, comprising at least one coupling sector, said structures being kept safely coupled preloading applied by at least one mechanically tightened peripheral metallic band, including a first plurality of rigidity modifying components, connected between a first of said structures and said at least one coupling sector of said third intermediate structure, and a second plurality of rigidity modifying components, which join said structures to be interconnected, clearing said at least one coupling sector of said third intermediate structure.

Moreover, the system according to the invention also allows to carry out other functions which could not be carried out in the prior art by the coupling systems known until now. For example, by means of its incorporation, it is possible to obtain a temporary change of rigidity of the mentioned joint to provide the dynamic-structural coupling modification between the interconnected structures in order to modify the Flight Control Law of a launching vehicle, for example, or a modification may be made of the joint geometry with the purpose of achieving a new orientation between both coupled structures, for example, in the case of folding and sighting antennas or when it is necessary to separate satellite constellations.

The invention may also have an application when it is necessary to uncouple or isolate thermoplastic deformations and the thermal couplings between the interconnected structures, such as in the assembly of telescopes and/or payloads requiring significant uncoupling.

Also, by means of incorporating the system according to the invention, it is possible to channel load transmission between two coupled structures through previously defined discrete joints.

These and other objects, which are obvious for the experts in art are accomplished by means of a system like that described in claim 1.

BRIEF DESCRIPTION OF THE DRAWINGS

In the drawings:

FIG. 1 is a very simplified diagram of the coupling system according to the invention in its simplest embodiment.

DESCRIPTION OF THE PREFERRED EMBODIMENT

Figure 2:
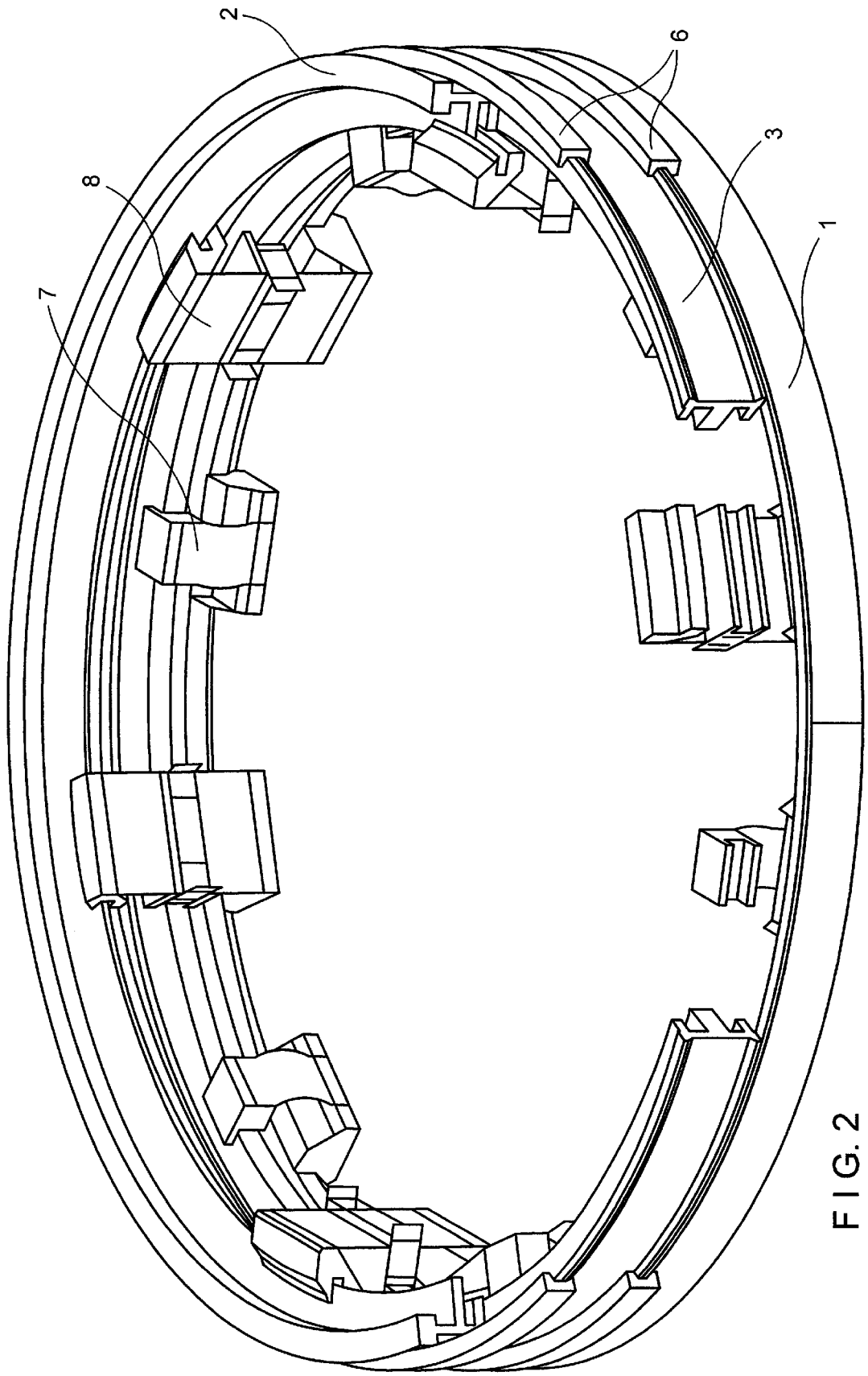
FIG. 2 is a schematic perspective view of the coupled structures in FIG. 1.

The following refers to the attached drawings, in which similar parts have the same reference numbers in all figures to describe a preferred embodiment of the system according to the invention, applied, as an illustration, to the space technology field.

Hence, in FIG. 1, the upper part of a first structure 1 is diagrammatically shown for example, a launching vehicle, and the lower part of a second structure 2, for example, a payload consisting of a satellite or container, whose coupling mouths 1a, 2a, provided with flanges 4, 4, are connected with the interposition of an intermediate structure 3, provided with flanges 5, 5 at both ends. In this specific case, it will be considered that both structures 1 and 2 to be coupled are bodies of rotation, on being the more usual case, although the experts in the art will easily understand that the invention is applicable to structures with any other cross section configuration.

The interlocking of said structures 1, 2 and 3, in order to form an assembly with the necessary mechanical features, may be achieved, for example, by arranging tightening bands 6 around said flanges or adapting rings 4, 5 (see FIG. 2) like, for example, in Spanish patent applications 9501994 and 9702028, in the applicant's name, whose description is incorporated herein by reference. Said metallic tightening bands 6 apply a preload, providing the necessary joint stresses.

However, any other type of coupling already known in the art may be used with this purpose.

Below, a coupling system comprised by three generally cylindrical structures and two tightening bands will be considered in order to facilitate the description.

Inside, at least one first plurality of joint components 7 which modify the rigidity are provided, joined at their ends respectively to the inner face of the first structure 1 and to the inner face of the coupling section forming the intermediate structure 3. Moreover, between the mentioned inner face of the intermediate structure 3 and the inner face of said second structure 2, a second plurality of joint components 7 may be provided. The number in which said components 7 are provided, both in said first and in said second plurality thereof, as well as their mechanical features will be dictated by the specific application in each case.

Also arranged inside each coupling, there may also be a plurality of rigidity modifying joint components 8 connected at their ends, respectively, to the inner face of structures 1 and 2, clearing the mentioned intermediate structure 3. Both the number and mechanical features of these components 8 will likewise depend on each specific application.

Said rigidity modifying components 7 and 8 provide bistable components, which benefit from the critical or Euler load concept. Each one of these bistable components is based on the behavior of a strap which may adopt two states: a first unstable state in which bending had been imposed until surpassing the critical load (condition represented in FIG. 2) and a second, stable or rest state, in which said load had not been exceeded and in which said component recovers its original length.

Likewise, the mentioned components 7 and 8 contribute the properties required by the system according to the invention, meeting rigidity functions, activation to separate interlocking structures, dynamic dampening, thermal insulation and capacity to change coupling geometry.

Below, reference will be made to FIGS. 3A–C and 5A–C, to explain the operation of a first embodiment of the coupling system according to the invention.

Figure 3A:
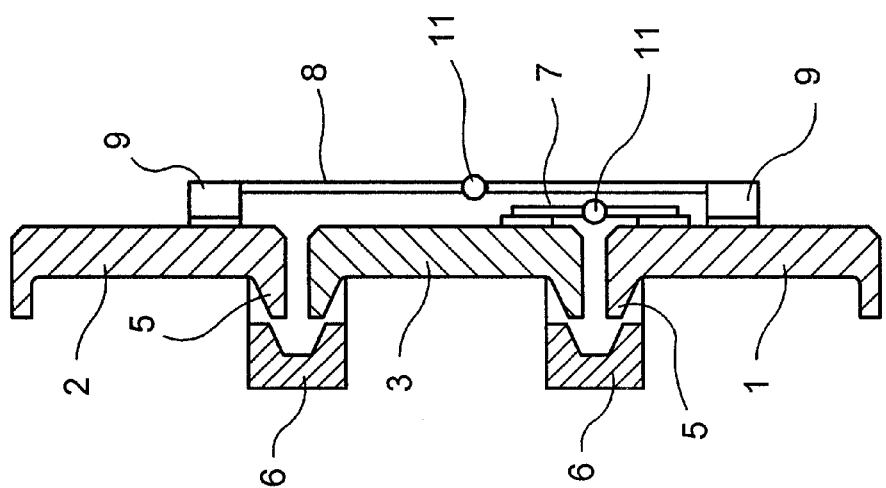
FIGS. 3A–C are diagrammatic views, in cross section, illustrating the operation of a first embodiment of the coupling system of FIG. 1.

FIG. 3A shows diagrammatically the starting condition in which both structures 1 and 2 are rigidly connected by means of the third structure 3 by the coupling of the two rings 6 with the flange pairs 4,5. In said figure, according to a first embodiment of the invention, the rigidity modifying components 7 and 8 are shown, idealized as bistable linear assemblies, in their first condition of instability, indicating with the number 9 the fastening positions of said components 7 and 8 to the inner faces of the structures 1 and 2 and with 10 the fastening position of a component 7 to the inner face of said intermediate structure 3. Ideal joint positions for said components 7 and 8 are indicated with number 11.

Figure 5A:
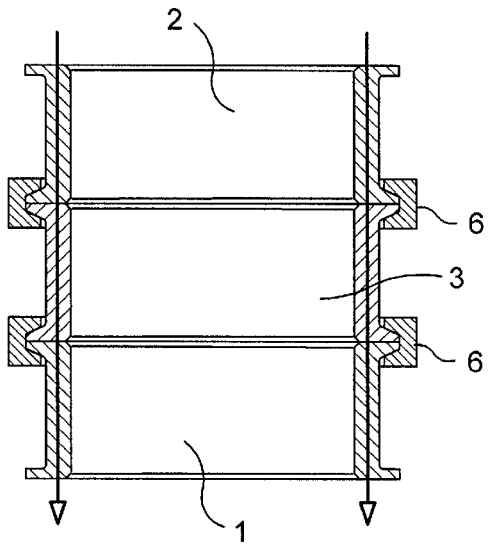
FIGS. 5A–D are diagrams illustrating the transmission of strains between two coupled structures by means of the system of the invention.

This first condition is also shown in FIG. 5A, where a thick arrow c shows the direct route along which the loads induced in one of the coupling structures are transmitted to the structure located on the other side of the former. This initial configuration is valid, for example, to support induced loads, providing the referred structural characteristics.

Figure 3B:
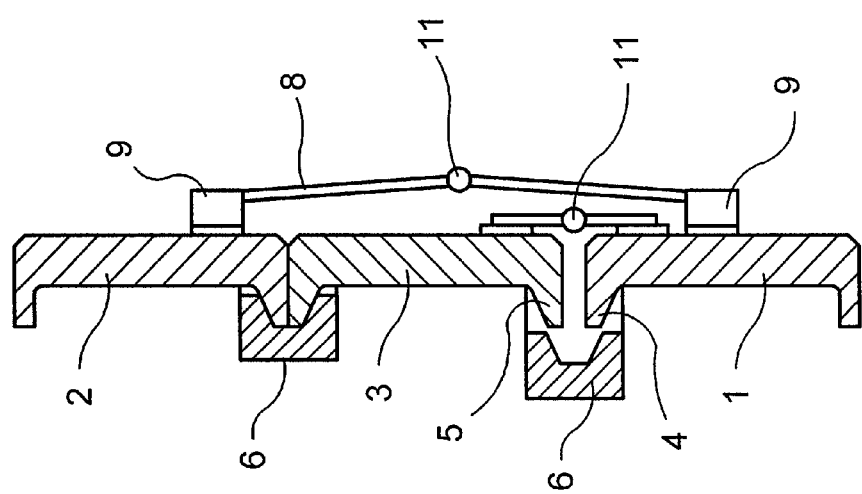
Figure 5B:
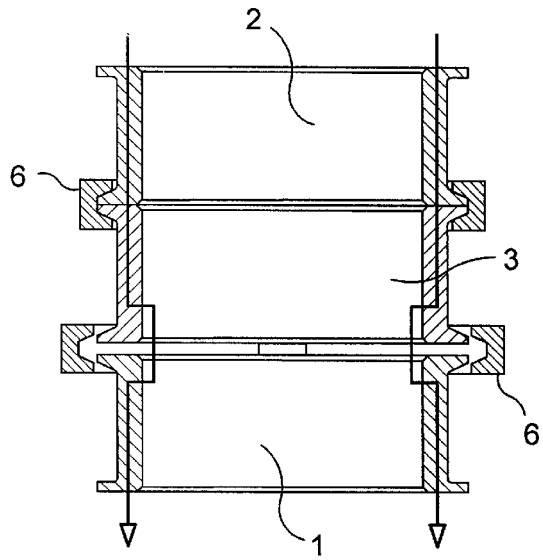

Now, directing our attention to FIGS. 3B and 5B, the condition adopted by the coupled structures and that of coupling on the breakage of one of the tightening bands 6 is shown, for example, that maintaining the first structure 1 and the intermediate structure 3 coupled. The lower band 6 has been separated from said flanges 4, 5 in a way known in the art and not described in detail in this specification, permitting that the action of the bistable components 7, on recovering their rest condition, separate said flanges 4 and 5. In FIG. 5B, the route then followed by a load to be transmitted among the coupled structures may be seen (thick arrow c).

In this way, the structural properties are determined in this phase by the new load transmission route which, in turn, is defined by new structural joints, predetermined according to the application. Usually, the sizing and number of components 7 which then comprise the interconnections of greater rigidity between structure 1 and the set of structures 3 and 2 are selected to obtain lower structural features (lower rigidity) than those of reference previously defined.

Figure 3C:
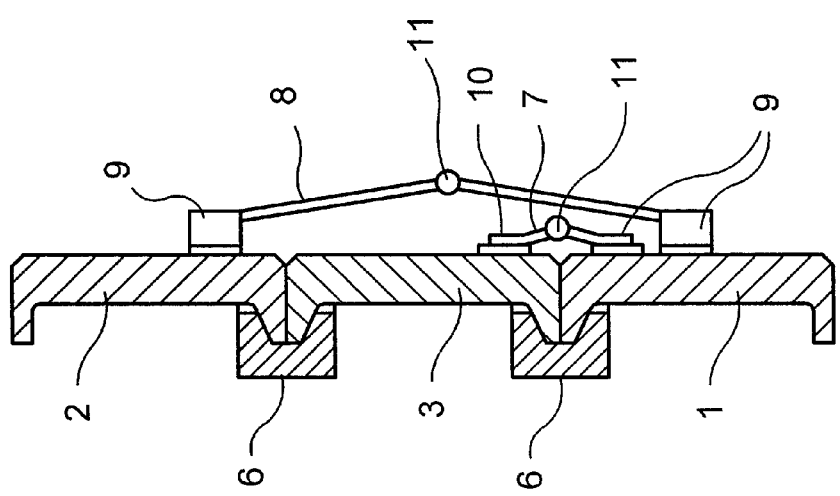
Figure 4C:
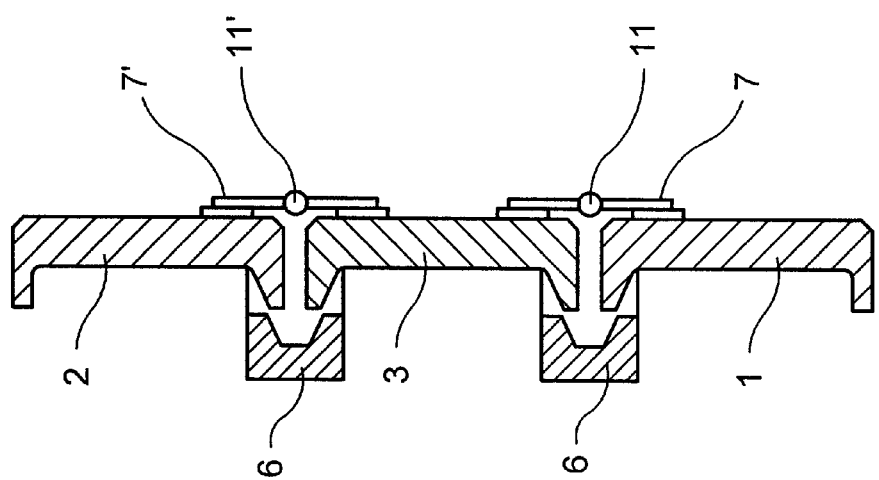
FIGS. 4A–C are diagrammatic views, in cross section, illustrating the operation of a second embodiment of the coupling system of FIG. 1.
Figure 4B:
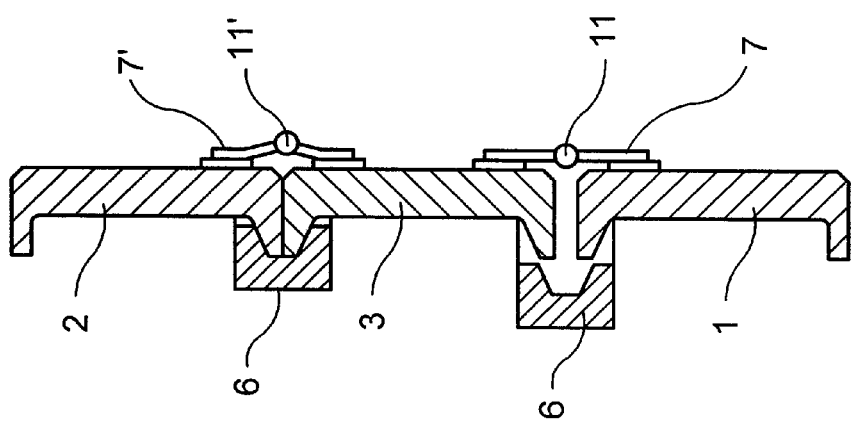
Figure 4A:
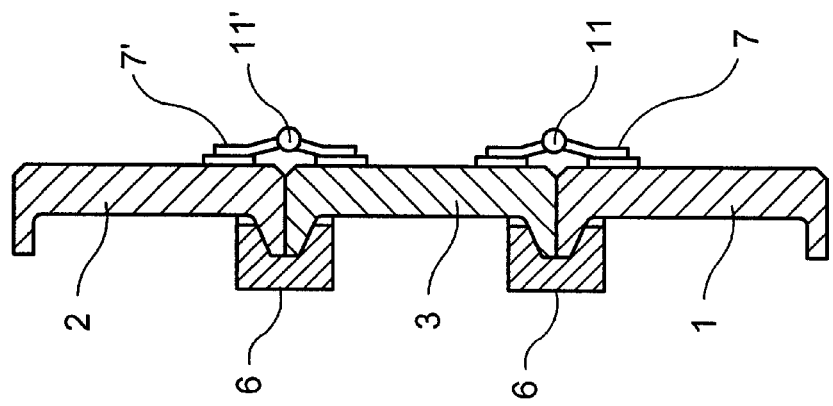
Figure 5C:
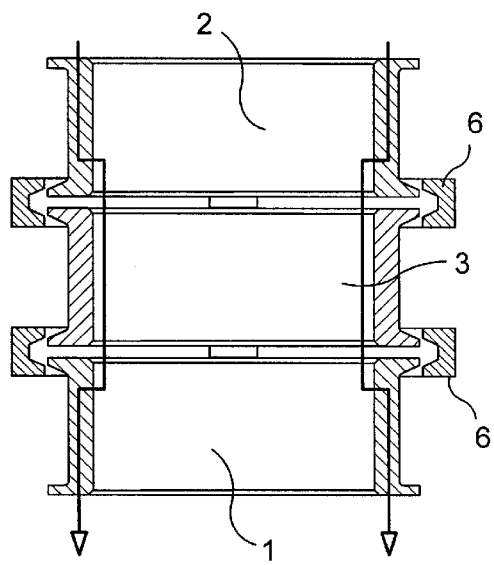
Figure 5D:
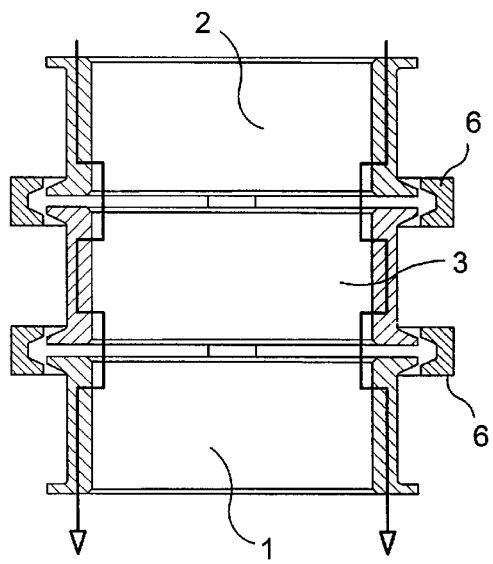

Finally, reference will be made to FIGS. 3C and 5C of the drawings. In them, the condition the structures coupled by means of the system according to the invention would adopt and the new load transmission route are shown, respectively, if after separation from the structures 1 and 3, it were necessary to recover structural features of a greater magnitude. This would be achieved provoking the separation of the second band 6, so that the bistable components 8 would have to recover their rest condition, actuating the structures 3 and 2 to separate them.

Then, the bistable components 8, with greater structural features (greater rigidity) than components 7, would be the components which would satisfy, as from then, the function of final coupling between the structures 1 and 2. In said FIG. 5C, the interconnection relation in which structures 1, 2, 3 would remain may be verified, as well as the new transmission route (thick arrow C) of loads between the structures 1 and 2.

On the other hand, in FIGS. 4A–C, 5A, 5B and 5D, the operation of a second preferred embodiment of the invention may be considered, in accordance with which the largest straps 8 are obviated, replacing them by a second set of straps 7' having a joint 11'. In this case, the correspondence between FIGS. 4A and 5A, 4B and 5B and 4C and 5D show the different stress transmission routes thick arrow C in FIGS. 5A, 5B and 5D between the coupled structures, depending, as before, on the order of release of the tensing rings being the same as that described for the first embodiment of the invention.

The preferred application of the invention is as an attenuation system for shocks induced by the pyrotechnical separation of the stages of a launching vehicle adapted to place a satellite in orbit, consisting of three cylinders (1, 2, 3) (as the first, second and intermediate stuctures) joined by means of two tightening bands (6), a first assembly of bistable rigidity modifying components (7), for example in a number of three, joining the intermediate and lower cylinders (3, 1) and a second set of bistable rigidity modifying components (8), joining lower and upper cylinders (1, 2) which would operate as follows.

During launching and flight, until the moment of a first stage having to detach itself from the launching vehicle, the six rigidity modifying components (7, 8) remain in an unstable condition, all the structures being directly connected by the tightening bands (6) and the assembly maintaining the reference structural features.

On receiving the pertinent order, the lower band 6 detaches, which then leaves the flanges of connected structures (1, 3) free; in that moment, the bistable components assembly (7) changes to a stable rest position, hence provoking a first change of the structural features, which become less than those of reference (less rigidity). In this condition of less coupling rigidity between launcher and payload, the effects over the latter of the shock generated by the pyrotechnical separation of a launching stage are reduced to a minimum.

Once said separation is produced, it may be necessary to recover, at least partially, some structural features (rigidity) nearer to those of reference, for which and on transmitting the pertinent order, the separation of the second upper band (6) is produced, releasing the flanges (5, 4) of the intermediate and upper structures (3, 2). When this occurs, the bistable components (8) adopt their stable rest position, hence recovering part of the rigidity lost in the previous operation.

Figure 6C:
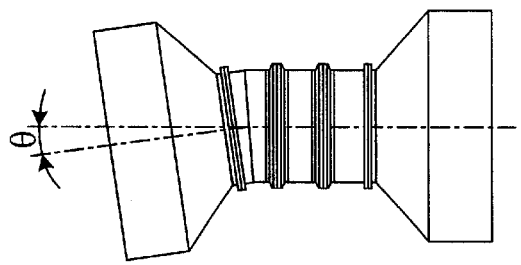
FIGS. 6A–E are diagrams illustrating different applications of the coupling system according to the invention.
Figure 6E:
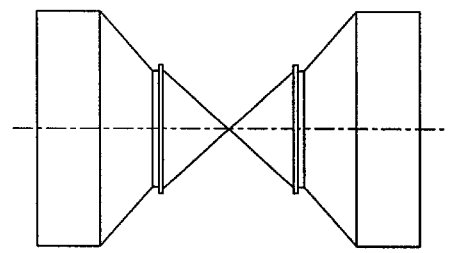
Figure 6B:
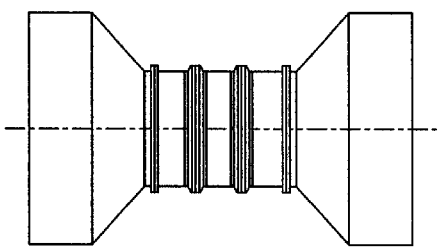

Finally and referring to FIGS. 6A to 6E, several applications of the system according to the invention are illustrated, where 6A shows its use as an attenuating structure filtering an applied shock according to the arrows CH; FIG. 6B shows its application as a filter structure with a variable rigidity and attenuation, whilst FIG. 6C is a scheme of use of the system according to the invention as a structure with variable geometry, permitting the modification, for example by an angle θ, of the aiming of one of the coupled structures and in FIG. 6E, the specific arrangement of the joint components 7, 8, permits the passage of loads to be channeled between both structures.

Figure 6D:
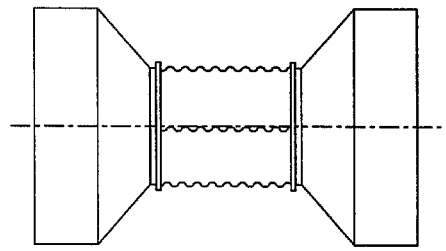
Figure 6A:
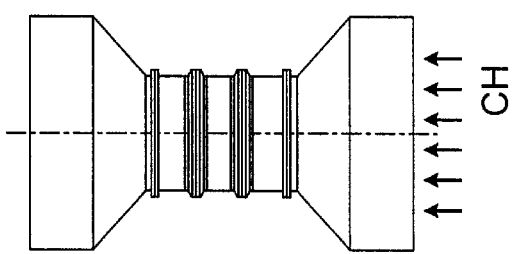

Regarding the remaining FIG. 6D, an embodiment variation of the system according to the invention is shown, where the intermediate structure 3 has been replaced by a bellow like structure, fulfilling the mission, entrusted, at least to one of the pluralities of joint components 7 to provide a continuous or discontinuous coupling between both coupled structures.

As may be verified, the invention provides a system that permits the attainment of an active or "intelligent" interconnection gathering all the functional capacities of the prior art systems, while its practical execution is simpler and may be included in any type of coupling.

What is claimed is:

1. A system for the modification of the rigidity and damping properties of structural joints, said system comprising at least an intermediate coupling structure (3) adapted receive, at both sides thereof, the application of two structures (1, 2) to be coupled;

first and second releasable blocking means (6) adapted to immobilize, in a mutual coupling relation, a first of said structures (1, 2) with a first part of said intermediate structure (3) and the second of said two structures to be coupled with a second opposite part of said intermediate structure;

a set of first extended bistable components (7), with a first feature of structural resistance, spaced around an internal periphery of said intermediate coupling structure and adapted to be fixed at one of their ends to an inner face of said first structure (1) to be coupled and, at the other end, are secured to an inner face of said intermediate coupling structure (3), each one of said first bistable components (7) being in a partially bent condition when said first structure is blocked with respect to said intermediate structure due to the action of said first releasable blocking means (6);

a set of second extended bistable components (8), with a second feature of structural resistance greater than that of said first bistable components (7), spaced around the internal periphery of said intermediate coupling structure and adapted to be fixed at one of their ends to the inner face of said first structure (1) to be coupled and at the other end adapted to be fixed to an inner face of said second structure (2), each one of said second bistable components (8) being in a partially bent condition when said first structure (1) is blocked in a coupling relation with said second structure (2) through said intermediate structure (3) and by the action of said first and second releasable blocking means (8), whereby a series of reference structural features, are defined.

2. A system according to claim 1, wherein said first and second structures (1, 2) have a flange part (4) at their coupling ends and said intermediate structure (3) includes a coupling flange part (5) at both of its ends adapted for facing the flange parts of the first and second structures, each of said first and second releasable blocking means (6) consists of two tightening rings, adapted to be peripherally fitted around the flange parts of the intermediate structure and the facing flange parts of the first and second structures.

3. A system according to claim 1, further comprises of means, in said first and second releasable blocking means (6), to break, at a determined moment, the blocking relation thereof with said coupled structures.

4. A system according to claim 3, breakage of said blocking relation is produced independently in said first and second releasable blocking means.

5. A system according to claim 1, wherein, on breaking the blocking applied by said first releasable blocking means (6), said set of first bistable components (7) recover an unbent rest position and hence become the only connection between said first structure (1) to be coupled and said intermediate coupling structure (3).

6. A system according to claim 1, wherein said first bistable components (7) have, in an unbent rest position, structural resistance less than the reference structural resistance.

7. A system according to claim 5, wherein, when breakage of the blocking produced by said second releasable blocking means (6) between said intermediate structure (3) and said second structure (2) to be coupled is produced, said set of second bistable components (8) recover an unbent rest condition, hence becoming the only connection between said first and second structures (1, 2) to be coupled.

8. A system according to claim 5, wherein said second bistable components (8), in an unbent rest condition, have structural resistance greater than those of said first bistable components (7), but less than the reference structural resistance.

9. A system according to claim 1, wherein said intermediate coupling structure consists of a bellows type structure.

10. A system according to claim 1 in combination with said first and second structures.

11. A system according to claim 10, wherein the first and second structures have annular ends facing annular ends of said intermediate coupling part, said annular ends of the intermediate coupling part and said annular ends of said first and second structural parts including respective adjoining flanges, said tightening rings being peripherally fitted around the adjoining flanges of said intermediate coupling structure and said first and second structures.

* * * * *